United States Patent [19]

Cornell

[11] Patent Number: 4,831,920

[45] Date of Patent: May 23, 1989

[54] BALLISTICALLY TOLERANT ACTUATOR

[75] Inventor: Robert W. Cornell, West Hartford, Conn.

[73] Assignee: United Technologies Corporation, Hartford, Conn.

[21] Appl. No.: 456,906

[22] Filed: Jan. 10, 1983

[51] Int. Cl.[4] .............................................. F16J 1/00
[52] U.S. Cl. ........................................ 92/258; 92/168; 92/170.1
[58] Field of Search ................ 92/168, 169, 170, 171, 92/249, 250, 165 R, 29, 59, 257, 258; 91/509; 277/DIG. 10; 89/36 A; 411/39, 42, 1, 2, 8, 501–507

[56] References Cited

U.S. PATENT DOCUMENTS

| | | | |
|---|---|---|---|
| 497,358 | 5/1893 | Strong | 92/258 |
| 1,964,865 | 7/1934 | Tear | 92/249 |
| 2,409,842 | 10/1946 | Eaton | 92/165 R |
| 2,542,376 | 2/1951 | Torresen | 411/501 X |
| 2,815,994 | 12/1957 | Lippman et al. | 92/249 |
| 3,884,127 | 5/1975 | Simmons | 91/509 |
| 4,088,053 | 5/1978 | Tyree | 411/501 |
| 4,122,759 | 10/1978 | Runkel et al. | 92/168 |
| 4,211,151 | 7/1980 | Wallischeck | 92/165 R |
| 4,300,439 | 11/1981 | Degan et al. | 92/146 |

Primary Examiner—Edward K. Look

[57] ABSTRACT

Piston (25) and/or gland (20) structure for a hydraulic actuator (10) includes a plurality of deformable plate members (40, 45, 90 and 95) interconnected at a plurality of locations thereon by frangible fasteners (50). The fasteners are highly loaded in shear and fracture under conditions of abutment of the piston or gland with a ballistically damaged portion of the actuator thereby allowing the plate members to deform around the damaged portion, thus preventing jamming of the actuator.

11 Claims, 2 Drawing Sheets

4,831,920

BALLISTICALLY TOLERANT ACTUATOR

TECHNICAL FIELD

This invention relates to actuators such as those commonly used to position aircraft control surfaces and more particularly to such actuators tolerant of ballistic damage thereto.

BACKGROUND ART

Fixed-wing aircraft and helicopter control surfaces such as flaps, rudders and helicopter blades are typically positioned for the control of the aircraft by hydraulic actuators. Such hydraulic actuators usually include a piston connected to the control surface by a connecting rod and reciprocable within a cylinder, selective pressurization of the cylinder on opposite sides of the piston positioning the piston and thus the control surface connected thereto. It is common for a single control surface to be positioned by pairs of actuators whereby, in the event that one of the actuators is damaged, a redundant actuator may set the control surface for continued operation of the aircraft. Thus, it will be understood that if damage to one of the actuators is manifested in a jamming of the piston within the cylinder, the other actuator must not only power the control surface in the normal movement thereof, but must also overcome such jamming by movement of the piston of the damaged actuator past the point of the jam. Where, in the case of military aircraft, the jammed actuator has been damaged ballistically, such jamming is often the result of a rupture of the cylinder from the exterior thereof by a projectile such as a bullet. Such a rupture will inwardly deform a portion of the cylinder wall forming an obstruction therein to traversal of that portion of the cylinder by the piston. When the projectile strikes the connecting rod, damage to the rod may include cratering of the rod or formation of protuberances thereon which jam in the actuator cylinder gland (end seal portion).

In an effort to devise piston structures capable of traversing obstructions in the cylinder walls, and cylinder glands capable of allowing damaged connecting rods to pass therethrough, it has been proposed that the pistons and glands be provided with frangible portions whereby upon encountering an obstruction in the cylinder wall, or connecting rod, the affected frangible portion will rupture around the obstructions to allow the piston to move past the obstruction or the damaged rod to pass through the gland. In one such actuator, the piston and gland are provided with a plurality of circumferentially spaced segments defining a groove which receives an annular seal, the segments being spaced by radially extending slots and being frangible along a weakened portion or scribe line. The frangible segments may also be provided with an annular rib which upon encountering an obstruction, provides a mechanical advantage in breaking off the segments.

It will be appreciated by those skilled in the art that the provision of such a scribe line, ribs and slots in such actuators necessarily contributes to the complexity and cost of the actuator. Additionally, the provision of the radially directed slots adds to the risk of actuator fluid leakage past the piston under conditions of normal operation. It will be apparent that any piston or gland structures having a frangible portion, necessarily represents a compromise in fatigue strength required in normal operation. Similarly, pistons and glands of a more simple (uniform) shape but composed of a brittle material which breaks when encountering ballistic damage also represent sacrifices in fatigue strength required in normal actuator operation.

Composite actuator cylinders which absorb impact energy for purposes of preventing damage to the interior of the cylinder have been proposed. However, it would seen that such cylinders may be quite heavy and bulky for their intended use and that complete assurance of the prevention of damage to the interior of the cylinder, difficult at best to attain.

DISCLOSURE OF INVENTION

It is therefore a principal object of the present invention to provide an improved actuator tolerant of ballistic damage thereto.

It is another object of the present invention to provide such an actuator wherein risk of fluid leakage therein is minimized.

It is another object of the present invention to provide such an actuator having a continuous shape without slots, scribe lines or other weakened areas in rupturable portions thereof.

It is another object of the present invention to provide such an actuator without compromising fatigue strength required for normal actuator use.

It is another object of the present invention to provide such an actuator which is uncomplicated in form and economical in cost.

These and other objects which will become more readily apparent from the following detailed description taken in connection with the appended claims and accompanying drawing, are attained in the present invention by the provision in an hydraulic actuator of a piston and/or gland, each comprising at least a pair of deformable plate members interconnected at a plurality of locations thereon by frangible fasteners. The fasteners are rupturable (fracture) in shear under loads caused by abutment with a damaged portion of the actuator. When the fasteners rupture, the structural capacity of the piston is lost and the plates deform around the obstruction whereby jamming of the actuator is obviated. The plates may be coned to enhance the rigidity thereof under normal operating conditions and the deformability thereof under failure conditions. A plurality of plates in a laminated arrangement may be employed to enhance deformability under fracture conditions. The fasteners may comprise rivets, welded connections or other suitable fastening means. Rivets are preferred since shear failure thereof may be accurately predicted.

BEST MODE FOR CARRYING OUT THE INVENTION AND INDUSTRIAL APPLICABILITY

Figure 1:
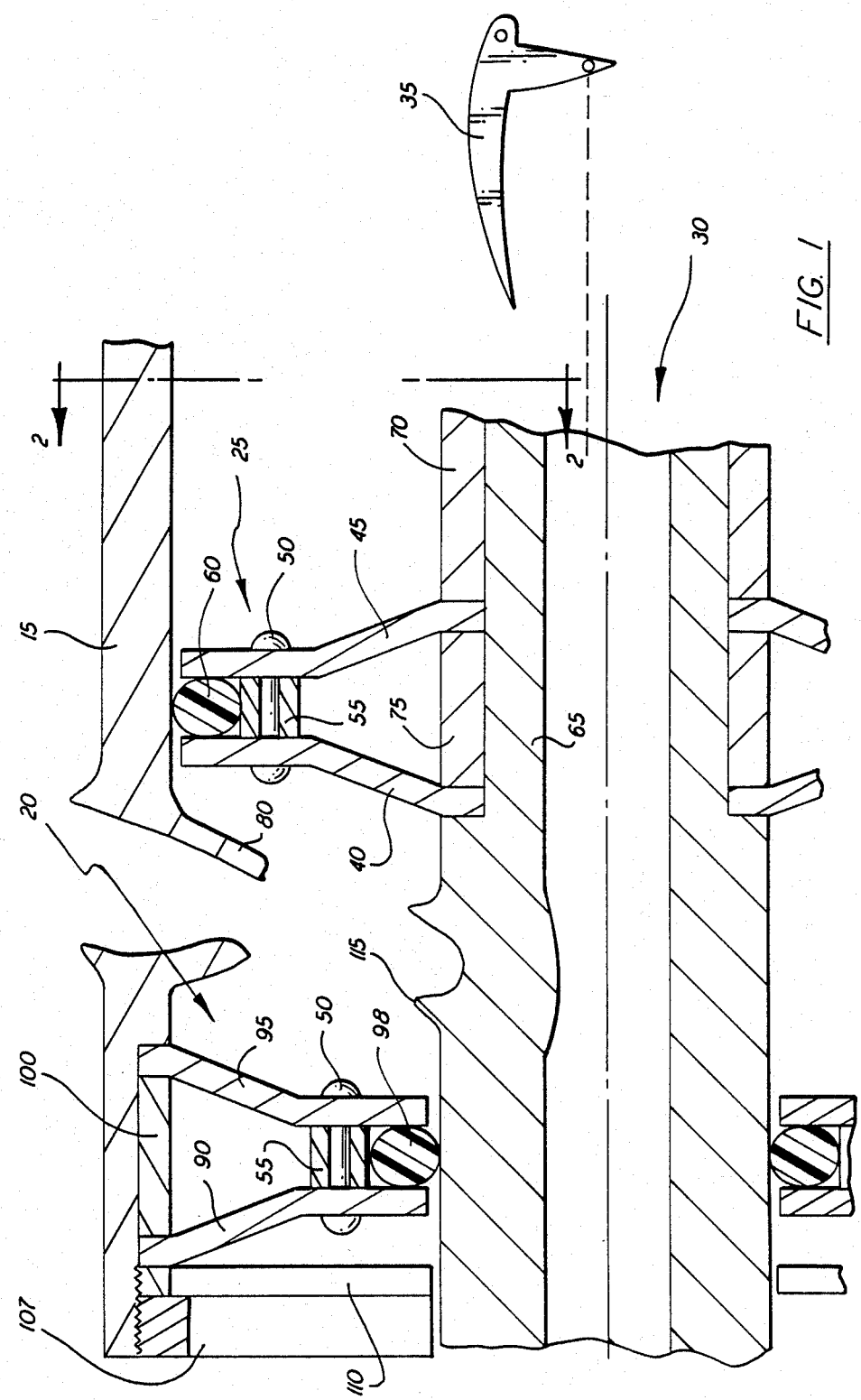
FIG. 1 is a fragmentary side elevation in partial section of the actuator of the present invention.
Figure 2:
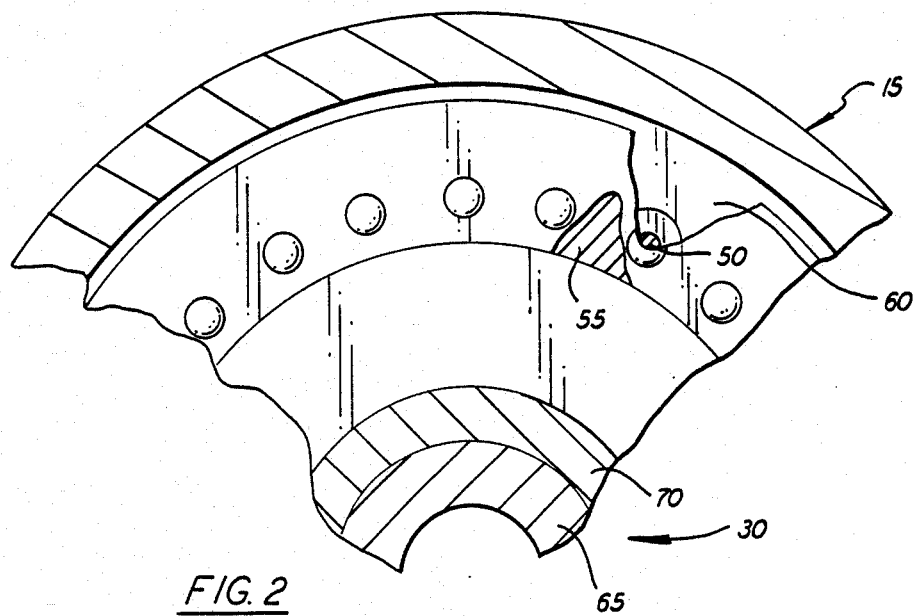
FIG. 2 is a fragmentary end elevation of the actuator taken in the direction of line 2-2 in FIG. 1, portions of the actuator being sectioned and broken away to show details of construction.

Referring to the drawing and particularly FIG. 1 thereof, the actuator of the present invention is shown at 10 comprising in general a cylinder 15 partially enclosed at opposite ends thereof by glands, one of which is shown at 20 and accommodating therewithin, a piston 25 fixed to a connecting rod 30. Pressurization of the cylinder on either side of piston 25 with hydraulic fluid will cause the piston to translate within the cylinder in the usual manner thereby moving aircraft control surface 35 or other output member as required.

Piston 25 comprises a pair of opposed deformable plate (sheet) members 40 and 45 connected at a multiplicity of locations thereon (at, for example, two-thirds the free span from the rod to the cylinder) by frangible shear fasteners 50 illustrated herein as rivets. As shown, each of the rivets is received through an annular spacer 55 which spaces the radially outer portions of the plates to accommodate an O-ring or similar equivalent seal 60 therebetween which in the usual manner, minimizes leakage around the outside of the piston and, as shown, may be retained at the radially outer position thereof by the sleeve.

Connecting rod 30 comprises a stepped inner shaft 65 surrounded by sleeve 70 and spacer sleeve 75, the spacer sleeve serving to properly space the inner peripheral portions of plates 40 and 45 to maintain a desired cone shape of the piston. As shown, the radially inner peripheral portions of the plates are captured between spacer sleeve 75 and sleeve 70 and may be secured to those members by any suitable technique such as preload, welding, brazing or the like.

In the event that cylinder 15 is ballistically damaged, such as by impact with a bullet or similar projectile, when the bullet enters the cylinder it will most likely form an obstruction 80 in the cylinder wall, which obstruction would cause a jamming of an ordinary actuator piston. However, when piston 25 engages obstruction 80, rivets 50 are highly loaded in shear, causing the rivets to rupture in the location of the obstruction. Such rupturing, disconnects (separates) the plates from one another whereby each plate may individually deform around the obstruction so that the piston may pass by the obstruction without jamming thereon.

It will be seen then, that the connection of the plates by rivets 50 provides a strong and rigid piston structure capable of handling normal activating fluid loads. By way of example, the illustrated piston structure has in the neighborhood of seven times the normal shear load applied to the rivets when a load equal to one-third of the normal piston hydraulic loading is encountered at the piston periphery due to engagement with an obstruction in the piston wall. Accordingly, it will be appreciated that despite such enhanced strength under normal loading, the rivets will rupture in shear so that the piston plate members will readily dissociate and deform to accommodate any obstructions in the cylinder wall.

The general structure of piston 25 is equally well suited for gland 20. As illustrated, gland 20 may comprise coned plates 90 and 95 joined by shear fasteners (illustrated as rivets) 50 which connect the plates with spacer 55 in the manner described with respect to the piston. As in piston 25, spacer 55 and the peripheral portions of the plates define a channel which receives O-ring or similar seal 98. Radially outer portions of the plates in gland 20 are separated by a spacer sleeve 100 and fixed to the spacer sleeve and cylinder 15 by any suitable technique such as by clamping with exteriorly threaded fastener (nut) 107. Seal 110 may be secured to the end of the cylinder by the nut for preventing contamination of the gland by foreign matter in the actuator's environment.

Gland 20 functions quite similarly to piston 25. As shown in the drawing, ballistic damage to rod 30 results in a cratering or deformation of the rod, the damage being defined by obstruction 115 in the surface of the rod. Under normal operating conditions, normal pressurization of the cylinder does not affect the gland structure. However, when encountering obstruction 115 in the connecting rod, high shear loading of the rivets results and the rivets rupture causing a local separation of the plates whereby each plate may individually deform around obstruction 115 to allow the obstruction to pass by the gland, thus preventing jamming of the actuator.

Figure 3:
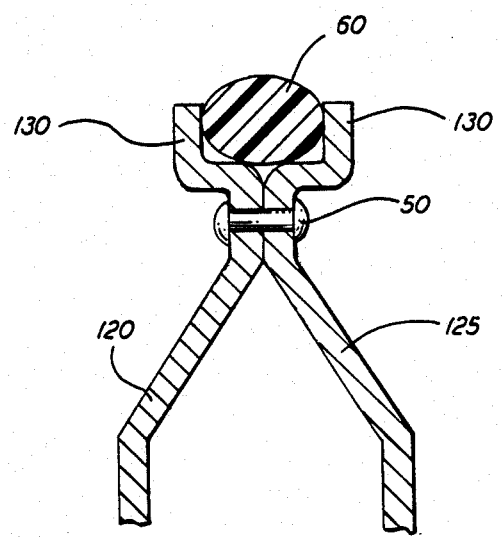
FIG. 3 is a fragmentary, partially sectioned elevation of an alternate embodiment of the piston shown in FIG. 1.

It will be appreciated that the actuator of the present invention utilizes piston and gland structures which effectively withstand normal hydraulic loading but readily rupture in shear at the connection of the plates when encountering obstructions due to ballistic damage to the actuator. While a particular embodiment of the actuator has been shown and described, it will be understood that various modifications of the invention will suggest themselves to those skilled in the art. For example, while the rupturable connection of the plates has been shown and described as a plurality of rivets, it will be understood that other connections such as fused (welded or brazed) connections as well as other forms of discrete fasteners may be employed without departing from this invention. Furthermore, while the piston and gland have been illustrated as comprising a single pair of plates or sheets, a plurality of plates in a laminated arrangement may be employed for enhanced structural degradation upon rupture of the connections therebetween. Likewise, while the plates employed in the piston and gland are illustrated herein as being of conical shape, for enhanced rigidity and strength of the piston and gland under normal operating conditions, and enhanced deformability when dissociated by rupture of the fasteners, other shapes such as simple planer shapes may be employed. By way of example, as shown in FIG. 3, plates of a modified conical shape may be employed. In this embodiment, each of plates 120 and 125 may be provided with an outwardly extending flange portion 130, the flange portions defining a channel which receives seal 60. It will be appreciated that in this configuration which may be employed in both the piston and gland, the spacer is not required. It is the intent of the following claims to cover these and other modifications as fall within the true spirit and scope of this invention.

Having thus described the invention what is claimed is:

1. A fluid actuator comprising a piston fixed to a connecting rod and longitudinally reciprocable within a cylinder in response to pressurization thereof with a fluid, said actuator being tolerant to ballistic damage thereto resulting in an obstruction in an inner surface of said cylinder, and characterized by:

said piston comprising first and second opposed, deformable plate members defining a pair of opposite piston faces pressurized by said fluid;

said plate members being interconnected at a plurality of locations thereon by fasteners, said fasteners having a compressive strength sufficient to accommodate normal hydraulic loading of said piston and being frangible when loaded in shear by an abutment of the outer portion of either of said plate members with said obstruction, thereby causing a separation of said plate members and individual deformation of said plate members around said obstruction.

2. The fluid actuator of claim 1 characterized by said fasteners comprising a plurality of rivets.

3. The fluid actuator of claim 1 characterized by said plate members including outer peripheral portions spaced a first distance apart and inner peripheral portions spaced a second distance apart said second distance being substantially greater than said first distance for enhancing the rigidity and strength of said piston under normal operating conditions and the deformability of said piston under conditions of abutment with said obstruction.

4. The fluid actuator of claim 1 characterized by said plate members including outer peripheral portions spaced apart a first distance and accommodating a seal ring therebetween.

5. The fluid actuator of claim 1 further including means for spacing said plate members apart, said spacing means being disposed between said plates adjacent said fasteners.

6. The fluid actuator of claim 5 characterized by said seal ring being retained at least in part along a radially inner portion thereof by said spacing means.

7. A fluid actuator comprising a piston fixed to a connecting rod and longitudinally reciprocable within a cylinder in response to pressurization thereof with fluid, said cylinder being provided with a gland through which said connecting rod extends, said actuator being tolerant to ballistic damage thereto resulting in a protuberance on said connecting rod and characterized by said gland comprising:

first and second opposed, deformable plate members interconnected at a plurality of locations thereon by fasteners, said fasteners having a compressive strength sufficient to accommodate normal hydraulic loading of said gland and being frangible when loaded in shear by abutment of said plate members with said protuberance, thereby causing a separation of said plate members and individual deformation of said plate members around said protuberance.

8. The actuator of claim 7 characterized by said fasteners comprising a plurality of rivets.

9. The actuator of claim 7 characterized by said plate members including outer peripheral portions spaced a first distance apart and inner peripheral portions spaced a second distance apart, said second distance being substantially less than said first distance for enhancing the rigidity and strength of said piston under normal operating conditions and the deformability of said gland under conditions of abutment with said protuberance.

10. The actuator of claim 7 characterized by said plate members including inner peripheral portions spaced apart a first distance and accommodating a seal ring therebetween.

11. The fluid actuator of claim 7 further including means for spacing said plate members apart, said spacing means being disposed between said plates, adjacent said fasteners.

* * * * *